Feb. 2, 1932.   O. H. BANKER   1,843,195
AUTOMATIC CHANGE SPEED TRANSMISSION
Filed Feb. 12, 1931   6 Sheets-Sheet 4
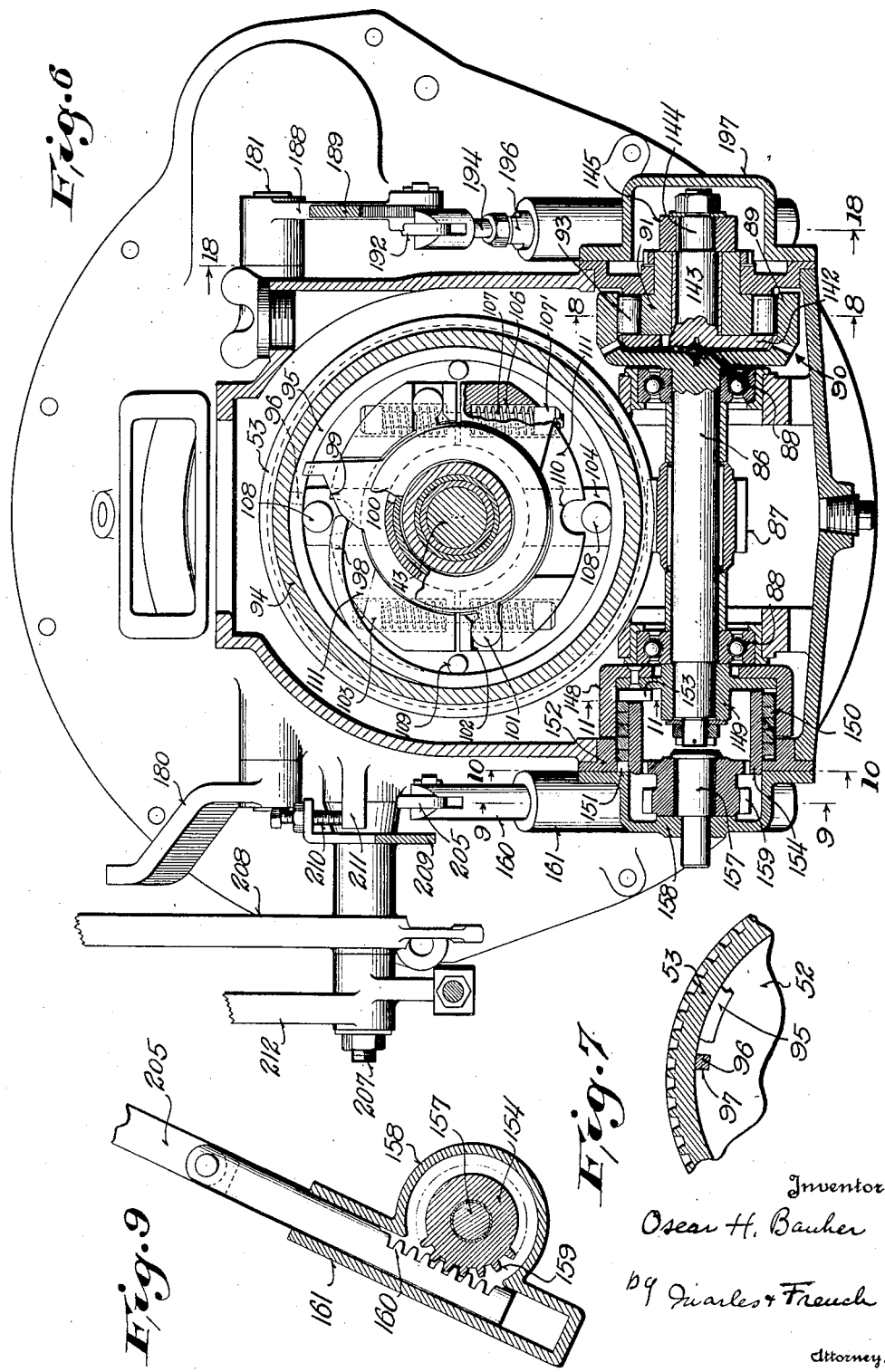

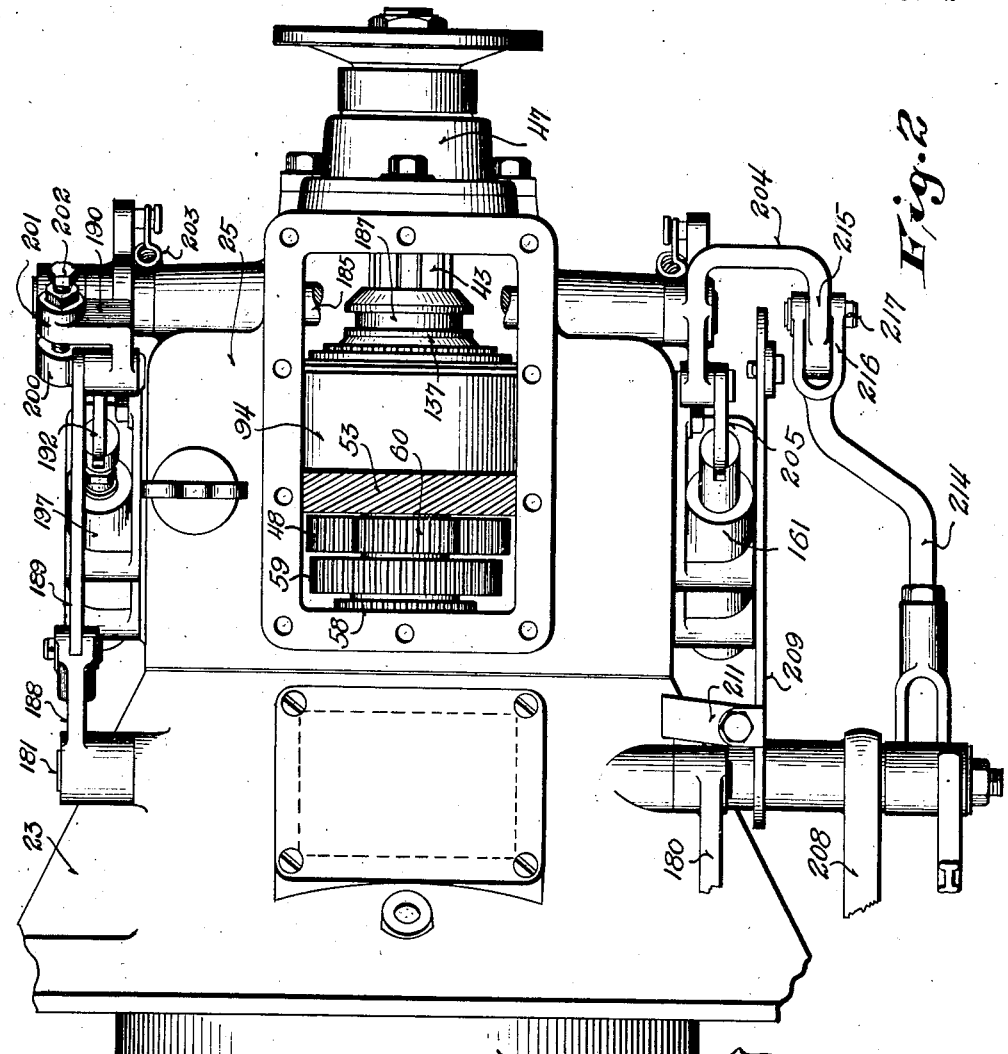
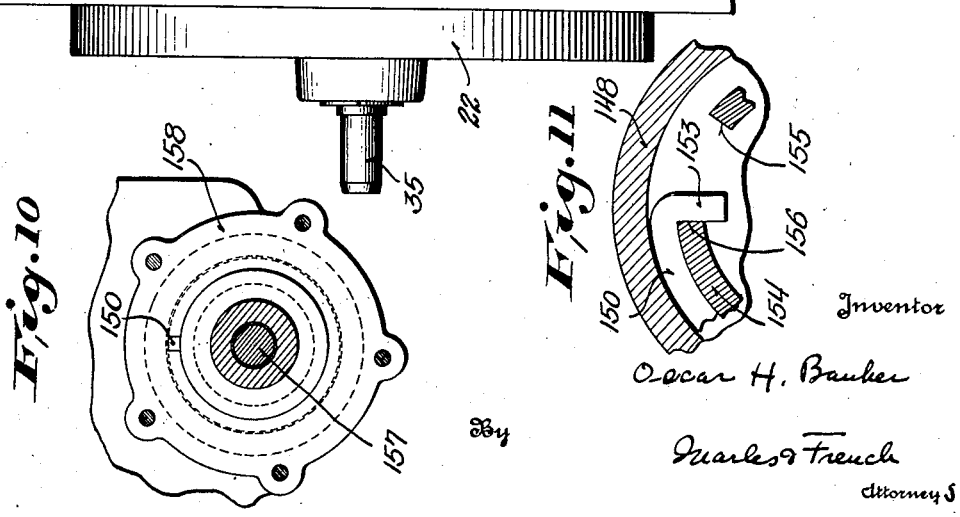

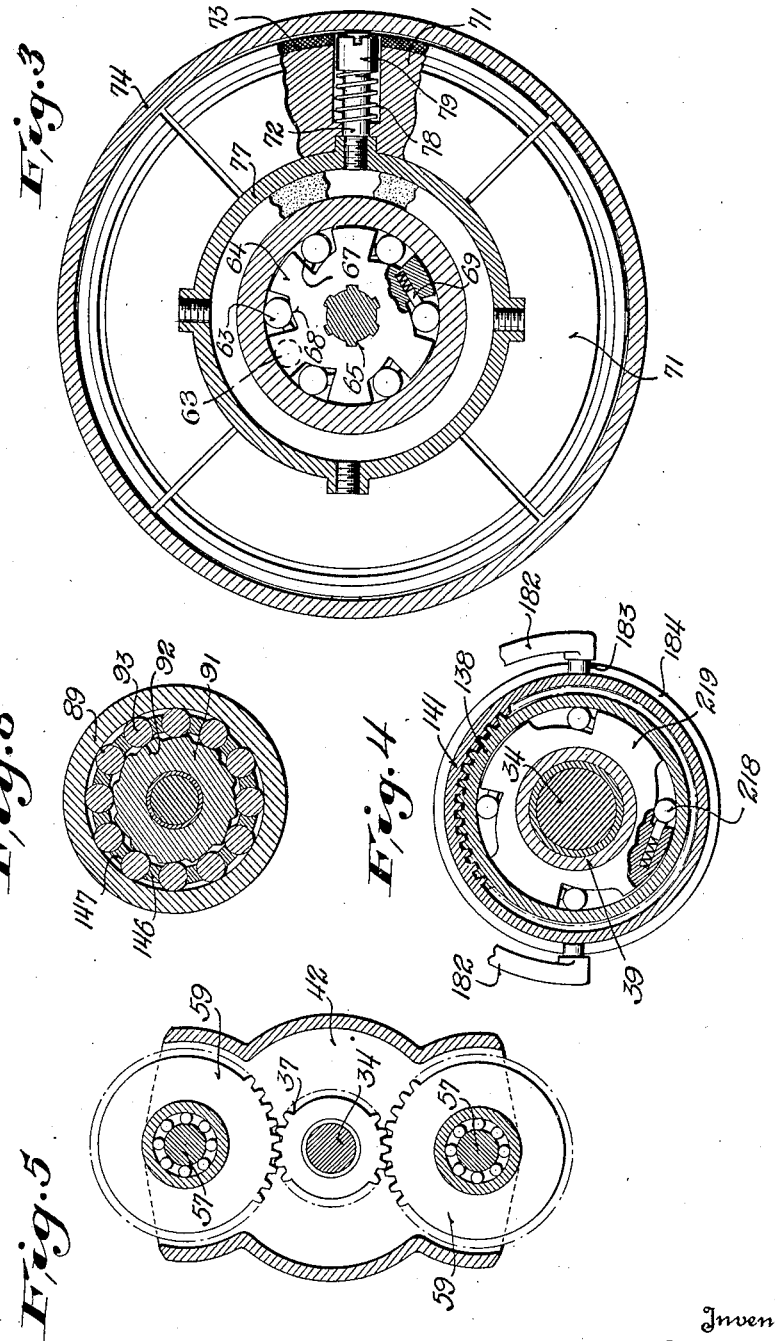

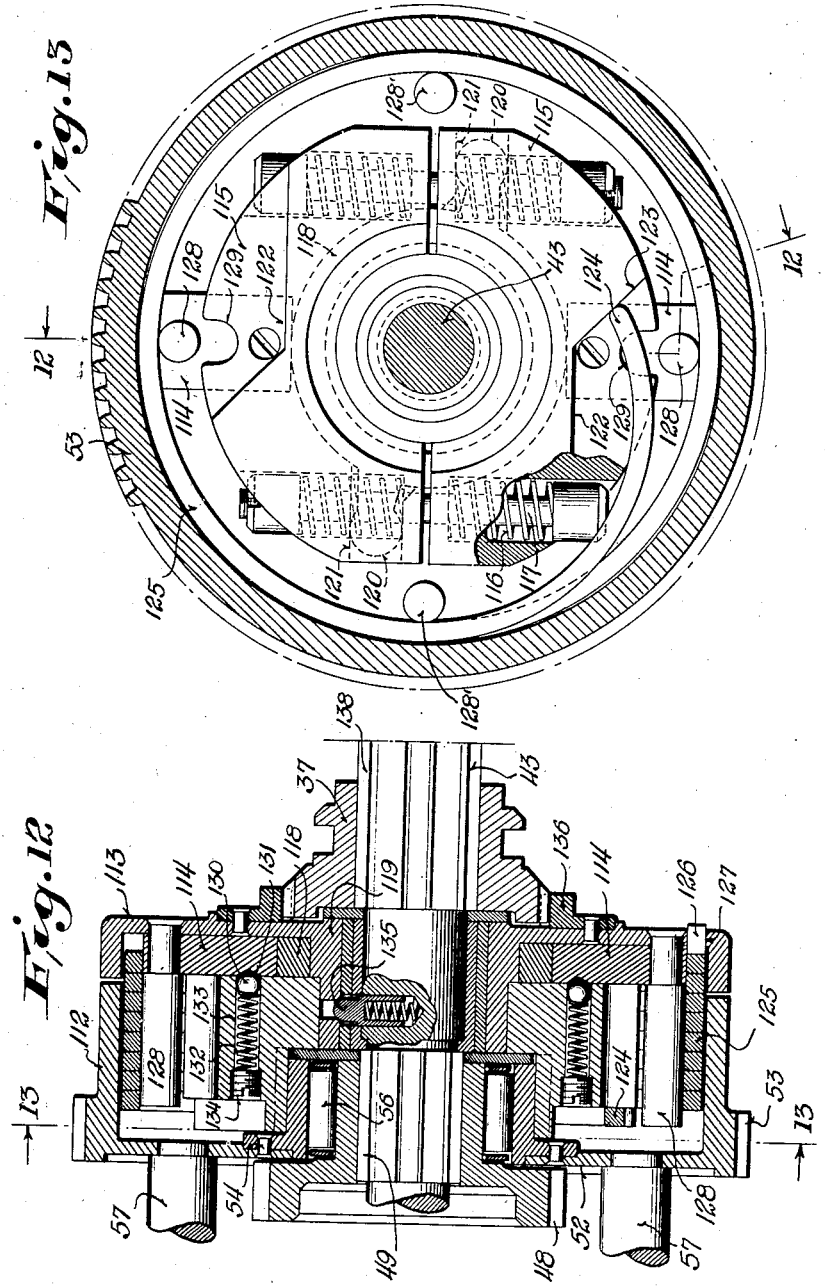

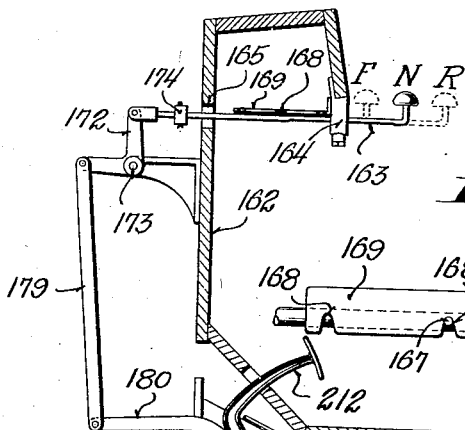
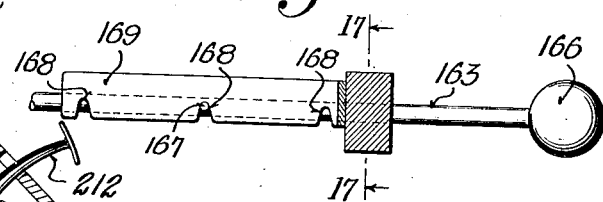
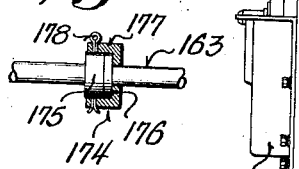
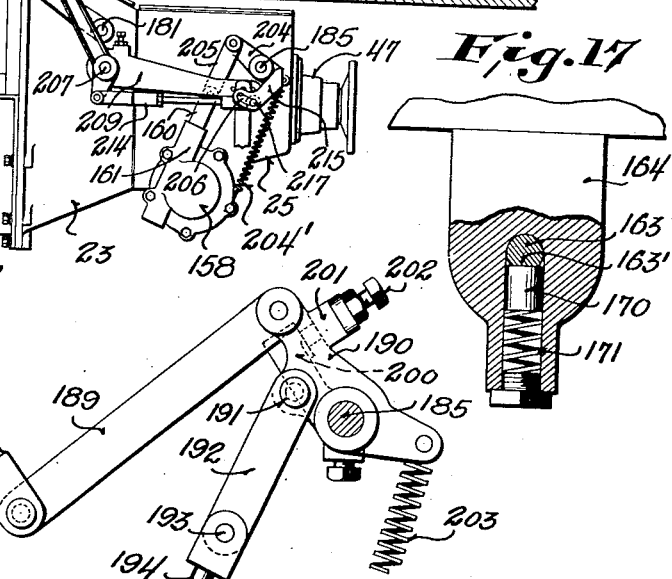
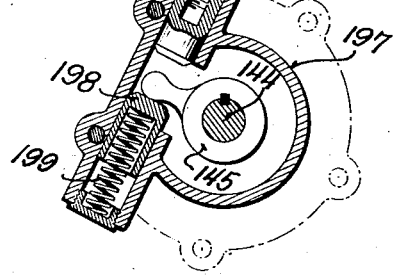

Patented Feb. 2, 1932

1,843,195

UNITED STATES PATENT OFFICE

OSCAR H. BANKER, OF CHICAGO, ILLINOIS, ASSIGNOR TO CONTINENTAL ILLINOIS BANK & TRUST COMPANY, OF CHICAGO, ILLINOIS, A CORPORATION OF ILLINOIS, TRUSTEES

AUTOMATIC CHANGE SPEED TRANSMISSION

Application filed February 12, 1931. Serial No. 515,219.

The invention relates to automatic change speed transmissions and more particularly to those of the planetary gear type.

In a prior application Ser. No. 472,125, filed July 31, 1930, I have shown and described a change speed transmission of the type above described wherein three changes in speed and reverse can be effected from a single epicyclic gear unit and wherein the transmission has two drive shafts associated with the planetary gear unit for this purpose. The present invention embodies the general gear arrangement of this prior application and has for one of its objects to simplify and improve the controls and their association with the gearing unit.

A further object of the present invention is to provide in a transmission of the general type above described an automatic spring clutch mechanism which causes the transmission to function smoothly and prevent sudden grabbing action of the clutch and permits of slippage between the drive and driven elements when the planet carrier runs ahead of the driven element.

A further object of the invention is to provide a transmission of the type above described with simple manual controls for respectively effecting the reverse and the immediate change from "high" to "second" speed without reducing the speed of the driven shaft when in "high" and for maintaining the vehicle in second speed as long as the operator desires.

The invention further consists in the several features hereinafter set forth and more particularly defined by claims at the conclusion hereof.

Referring to the drawings; Fig. 1 is a vertical sectional view taken through the housing of the transmission with the lower half of the rotating parts shown in full while the upper half shows a central vertical section through the transmission mechanism;

Fig. 2 is a plan view of the transmission embodying the invention, parts being broken away;

Fig. 3 is a detail vertical sectional view taken on the line 3—3 of Fig. 1;

Fig. 4 is a detail vertical sectional view taken on the line 4—4 of Fig. 1;

Fig. 5 is a detail vertical sectional view taken on the line 5—5 of Fig. 1;

Fig. 6 is a detail vertical sectional view taken on the broken line 6—6 of Fig. 1;

Fig. 7 is a detail sectional vertical view taken on the line 7—7 of Fig. 1;

Fig. 8 is a detail vertical sectional view taken on the line 8—8 of Fig. 6;

Fig. 9 is a detail vertical sectional view taken on the line 9—9 of Fig. 6;

Fig. 10 is a detail vertical sectional view taken on the line 10—10 of Fig. 6;

Fig. 11 is a detail sectional view taken on the line 11—11 of Fig. 6;

Fig. 12 is a detail vertical sectional view showing certain modifications in the automatic clutch mechanism;

Fig. 13 is a detail sectional view taken on the line 13—13 of Fig. 12;

Fig. 14 is a side elevation view of the transmission embodying the invention showing its installation in an automotive vehicle;

Fig. 15 is a detail enlarged plan view of a part of the control mechanism;

Fig. 16 is a detail view, partly in section, of part of the control;

Fig. 17 is a view, partly in section, taken along the line 17—17 of Fig. 15;

Fig. 18 is a view of one of the controls, partly in section and taken along the line 18—18 of Fig. 6.

Figure 1:
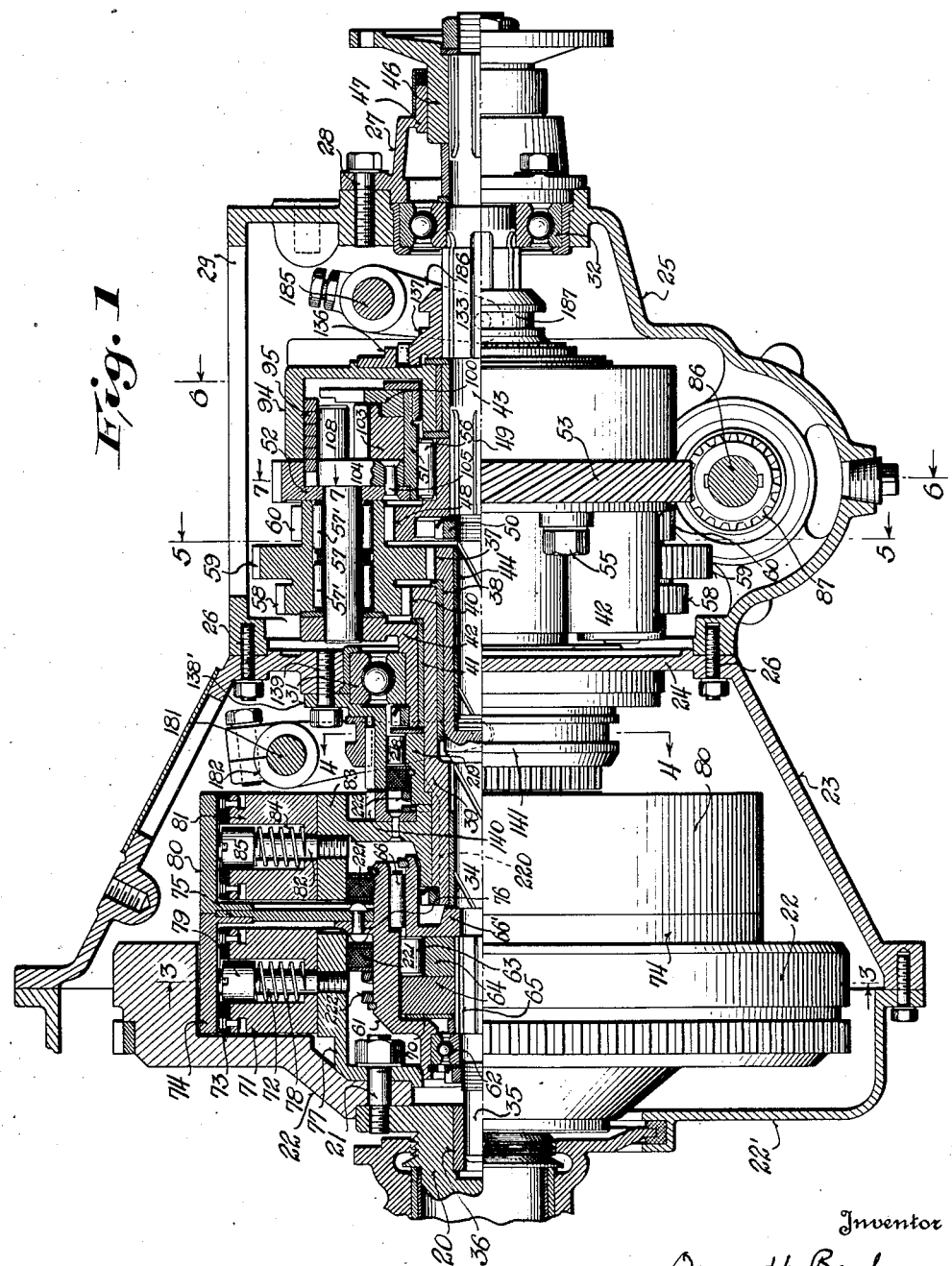

Referring to the drawings, and more particularly Fig. 1, the numeral 20 designates the drive shaft or crank shaft of the engine connected by bolts 21 to the fly wheel 22 of the engine enclosed in the housing formed by the engine crank case 22' and a housing section 23 detachably secured thereto and provided with an end plate portion 24 and housing certain elements of the transmission while the casing section 25, secured to the section 23 by bolts 26, houses other parts of the transmission and has a coupling housing 27 secured to the end thereof by bolts 28, said section 25 having an opening 29 in the top thereof adapted to be covered over by a suitable cover plate, not shown.

The end plate 24 and the outer end 30 of the section 25 are respectively equipped with ball bearing journals 31 and 32. A drive shaft 34 has one end 35 journalled in the bushed bore 36 of the crank shaft and has a gear 37 at its other end formed integral therewith or connected thereto and at this end is journalled in the bushed bore 38 of the hollow or tubular drive shaft 39 provided with a gear 40 and in turn journalled in the bearing 41 of the part 42 of a planet gear carrier which part in turn has a hub portion journalled in the ball bearing journal 31.

A driven shaft 43 has one end journalled in the bushed bore 44 in the shaft 34 and its other end journalled in the bearing 32 and has a propeller shaft coupling flange 46 splined to it and extending loosely through the end 47 of the housing 27. The shaft 43 has the driven gear 48 splined to it, as at 49, and secured against endwise movement in one direction by a suitably locked nut 50.

The planetary gear carrier in addition to the part 42 includes a spider or flanged disk 51 which is connected to the web 52 of a lock gear 53 by rivets, such as the rivets 54 shown in Fig. 12, and which gear in turn is secured to said part 42 by bolts 55. The hub of the disk 51 is journalled on the bearing rollers 56 working between it and the hub of the gear 48.

The parts 42 and 51 have planet shafts 57 secured thereto on which the planet gears 58, 59 and 60 are mounted, these gears preferably being integrally formed compound gears journalled on roller bearings 57' and meshing respectively with the gears 40, 37 and 48.

With the above gearing arrangement, low speed is obtained when gear 37 is the driver and the planet gear carrier is held against rotation, the drive then being from the shaft 34 through gears 37, 59, 60 and 48 to the driven shaft 43; second speed when gear 40 is the driver and the planet gear carrier is held against rotation, the drive then being from shaft 39, through gears 40, 58, 60 and 48 to the shaft 43; high speed when the planet carrier and its gears revolve with the shafts 34 and 43; and reverse is obtained when the planetary gear carrier is allowed to rotate freely and the shaft 39 held against rotation while gear 37 meshing with gear 59 drives the planetary carrier around gear 40 in an anti-clockwise direction and thus through the gear 60 drives the gear 48 and the shaft 43 in the reverse direction to that of the shaft 34.

For obtaining the drive from the shaft 20 to the shaft 34, I show in Figs. 1 and 3 one arrangement of clutch mechanism. Upon the shaft 34 is mounted an overrunning clutch comprising a clutch drum 61 whose hub is journalled at one side on the ball bearing journal 62 mounted between it and the shaft 34 and at the other on roller bearings 66 on a retainer ring 66' mounted on said shaft. The overrunning clutch is of improved construction and has two sets of clutch rollers 63 cooperating with the drum and with actuators 64 splined at 65 to the shaft 34. As shown in detail in Fig. 3 in connection with one of the actuators, each actuator 64 has wedging recesses 67 formed therein and in which the rollers 63 work and are adapted to be wedged by the inclined or wedging surfaces 68 of said recesses into locked engagement therewith and with the drum in one direction of rotation and to be released from the drum in the event shaft 34 runs faster than drum 61, each of said rollers being normally urged toward clutched position by a spring pressed plunger 69. The rollers 63 for one actuator are offset or staggered with reference to the other as indicated by the roller in dotted lines in Fig. 3, with the result that the clutching surface is increased and the actuator disks form stops for one of the ends of each set of rollers while the plate 70 and the ring 66' limits the free movement of the other ends of the rollers disposed adjacent thereto.

For connecting the drum 61 with the shaft 20, I provide an automatic clutch including the segmental weights or shoes 71, each of which is slidably mounted on a stud 72 and driven thereby and is provided with a clutch lining 73 engageable with a drum 74 whose disk portion 75 is secured as by rivets 76 to a flange on the drum 61. The studs 72 are anchored at their inner ends on a spider or flanged disk 77 secured to the crank shaft 20 by the bolts 21. The outward movement of the weights 71 under the action of centrifugal force is resisted in each instance by a spring 78 interposed between the weight and a tension-adjusting nut 79 on the stud 72. When the engine is not running the weights 71 are free, but after the engine has been started and the speed of the shaft 20 becomes such as to overcome the inertia of the shoes 71 and pressure of the springs 78, said shoes move outwardly under the action of a centrifugal force into driving engagement with the drum 74 and thus connect the drum 61 for rotary movement with the shaft 20 and this causes the rollers 63 to assume a driving position relative to said drum and the actuators 64 with the result that the shaft 34, and hence the gear 37, is then turned by the engine to drive the planetary gearing to provide the low or first speed drive.

While in low gear, the gear 58 being a part of the compound planet gears and in mesh with the gear 40, causes said gear 40 to turn in a clockwise direction at a higher speed than the gear 48 associated therewith and at a predetermined speed, for example five to eight miles per hour car speed, causes the operation of a speed responsive clutch mechanism that connects the shaft 39 with the shaft 20 to obtain second speed through the epicyclic gear train as previously set forth, and permits of the automatic driving release of the shaft 34, through the overrunning action of the clutch rollers 63.

As shown in Fig. 1 this speed responsive clutch mechanism may be generally similar to the first automatic clutch mechanism and includes the drum 80, the segmental clutch shoes or weights 81, similar to the shoes 71, and slidably mounted on the studs 82 and driven thereby, said studs being anchored in a hub portion 83 splined on the shaft 39, the outward movement of the weights 81 under the action of centrifugal force being resisted in each instance by a spring 84 interposed between the weight and a tension adjusting nut 85 on the stud 82.

In the condition of low and second speed as the change speed gear is of the planetary gear type there is a tendency for the planetary gear carrier to be revolved in the reverse direction to the driven gear and means are provided herein to utilize this tendency to automatically lock the planetary gear carrier against reverse movement which means are shown more particularly in Figs. 1, 6 and 8. The gear 53 secured to the planetary gear carrier is a spiral gear reducedly intergeared with a brake operating shaft 86 by meshing with the spiral gear 87 keyed to said shaft. The shaft 86 is journalled in the lower portion of the casing section 25 in ball bearing journals 88 and has a brake actuator 89 formed integral therewith or secured thereto and forming a part of an automatic one-way roller brake mechanism 90. This mechanism also includes a cam 91 fixed to the transmission case and provided with inclined wedge surfaces 92 adapted to be engaged by the rollers 93 interposed between said surfaces and the actuator 89. While the operative positions of these rollers are under manual control, for purposes hereinafter described, for the purpose of description thus far, it may be assumed that these rollers are in the position shown in Fig. 8, where on the tendency of the planetary carrier to rotate backwards, the actuator 89 is moved in a clockwise direction which causes the rollers to become wedged between said actuator and the stationary wedge surfaces 92 and thus stop the backward rotation of the carrier. However, it will be noted that where the planetary gear carrier is rotated in a clockwise direction by the driven member, it will release the automatic brake mechanism.

Thus with the present construction while in low gear, the gear 58 causes the gear 40 to turn in a clockwise direction at a higher speed than the gear 48 and when the speed of the gear 40 its shaft 39, hub 83 and weights 81 reach a predetermined value, said weights are moved to engage the drum 80 and the drive then being from the shaft 20 to the shaft 39, the gear 40 begins to revolve at engine speed and therefore gears 58, 59 and 60 revolve at a higher speed and consequently gear 48 and shaft 43 are driven at a higher or second speed. Under these conditions gear 59 being of larger diameter and revolving at a higher rate of speed at this instant causes gear 37 to revolve faster than engine speed and such increase in speed relatively speaking, being the same as running the drum 61 backwards or in a counter-clockwise direction, the rollers 63 of the overrunning clutch are released and while shaft 34 is free to turn the drive is from the engine shaft, hub 77, weights 71, drums 74 and 80, weights 81, hub 83, shaft 39, gears 40, 58, 60 and 48 to the shaft 43 with the vehicle in second speed. It will also be understood that the spring clutch mechanism hereinafter described may be used in place of the clutch including the weights 81.

It has been noted that the automatic brake mechanism preventing backward rotation of the planetary gear carrier may be released when the driven shaft reaches or exceeds the speed of the driver and this movement of the brake to disengaging position may be effected by the operator's partial deceleration of the engine temporarily so as to give the driven shaft a chance to reach the speed of the driver as by the operator's partial closure of the throttle valve of the engine. Consequently when the vehicle is in second speed and the driver wishes to go into high gear or direct drive, he partially decelerates the engine and allows the driven shaft to synchronize with the driving element of the gear and in doing so releases the planet carrier from the automatic brake mechanism and the automatic clutch mechanism now to be described operates to lock the planet gear carrier to a drum 94 which is then connected in driving relation with the shaft 43 and the vehicle is then in high gear.

An automatic clutch mechanism which has been especially developed for this purpose is shown more particularly in Figs. 1, 6 and 7. A coiled spring 95 forms the clutch element, one end 96 of which is bent and fits in an opening 97 in the web of the gear 53 which as we have seen forms a part of the planet carrier and the other end 98 of which is free and adapted to be engaged by a cam projection 99 on an oscillatory equalizer member 100 which is mounted to turn on the hub member 51 of the planet carrier. This equalizer 100 has diametrically disposed rounded projections 101 which work in slots 102 of oppositely disposed governor weights 103 that are mounted within the drum 94 and slidably keyed to diametrically disposed guide blocks 104 that are secured as by rivets 105 to the web 52 of gear 53. These weights are normally restrained against movement by springs 106 mounted in recesses in the weights and held in inoperative position relative to the same by tension adjusting rods 107 with adjusting nuts 107'. The spring 95 is retained in release position by diametrically disposed pins 108 projecting from the blocks 104 and another set of pins 109 secured to the web 52. The weights 103 have slots 110 affording clearance for the pins 108 and also clearance slots 111, one of which allows the free end 98 of the spring to engage the projection 99.

It is now noted that so long as the planetary gear carrier stands still, the weights 103 do not move. When, however, the operator of the vehicle decides that he is going fast enough in gear and wishes to change to high gear, he brings about a synchronization of the drive and driven shafts so as to permit the release of the automatic brake mechanism of the planetary carrier and allow it to rotate with its driven gear 48, thereby causing the weights 103 to move outwardly under the action of centrifugal force and against the resistance of the springs 106 and thus turn the member 100 in a direction to press outwardly against the end 98 of the spring 95 and thus move the coils of said spring into clutched engagement with said drum 94 so that the epicyclic gear train then revolves as a unit with the drive shaft 20 and driven shaft 43, the shaft 39 being then connected with the drive shaft 20 through the clutch mechanism previously described and the vehicle is then in direct drive or high gear. While this action of the high speed automatic clutch requires a synchronization of the speeds of the drive and driven shaft it does not require any normal shifting of gears by the operator.

Where it is not desired to employ an automatic clutch which depends on the operator's temporarily slowing down the speed of the engine shaft, the automatic spring clutch mechanism shown in Figs. 12 and 13 may be employed. In this the lock gear 53 that forms a part of the planet carrier is provided with a flange extension that forms a drum 112 and the driven shaft 43 is adapted to be connected to said drum through the clutch mechanism now to be described when the speed of said driven shaft reaches a predetermined value. A disk or drum 113 which for the present will be considered as fixed to the shaft 43 has diametrically disposed guide blocks 114 riveted thereto to form guides or keys for the governor weights 115, which weights are restrained against movement by springs 116 on the tension adjusting rods 117 arranged in the same way as the springs 106 of the weights 103 and an equalizer member 118 is mounted to turn on the hub 119 of the disk 113 and has the rounded projections 120 working in slots 121 in the weights. Each of the weights has a recess 122 formed in one side thereof and one side 123 of one of these recesses forms a cam surface adapted to be engaged by the free end 124 of a coiled spring clutch element 125 whose other end 126 is bent and passed through the opening 127 to anchor it to the disk 113. The spring 125 is retained in release position by the pins 128 secured to blocks 114 and pins 128′ secured to the disk 113 and the weights 115 are recessed at 129 to allow clearance for the pins 128. The weights 115 are prevented from hunting by spring pressed detents here shown as balls 130 engageable in recesses 131 in blocks 114 and releasably held in this position by springs 132 mounted in bores 133 and backed by the plugs 134 in threaded engagement with said bores. These detents provide sufficient resistance to the outward movement of the weights so that they will fly out with a definite and positive snap action when the speed of the shaft 43 reaches such an amount as to be somewhat in excess of the tension of the springs 116 and when said weights do so move the cam 123 on one of the weights acts on the free end 124 of the spring 125 to move it into clutched engagement with the drum 112 to establish the high speed drive.

When the vehicle is in high or direct drive, if its speed is diminished or slows down to such an extent as to permit the springs 106 to retract the weights 103 and thus release the clutch spring 95, or the springs 116 to retract the weights 115 and thus release the clutch spring 125, in each instance the one-way automatic brake of the planetary gear carrier will again hold said carrier stationary and the vehicle will then proceed in second gear and a further reduction in speed will permit the springs 84 to move the weight 81 to contracted position and hence release these clutch members 81 from the drum 81 and the vehicle will then proceed in low gear. Furthermore, since with the above constructions in the shifting from second to high the planet carrier in the first described high speed clutch arrangement runs ahead of its drive, the clutch can slip and thus prevent a violent grabbing action on the drum 94. Also with either of the above constructions if the driven shaft runs ahead of its driver the clutch element can slip.

It is sometimes highly desirable in driving to change immediately from high to second and in order that the operator, with the present automatic shift, may not have to wait for a reduction in speed of the vehicle to effect this change, means have been provided under the control of the operator, for immediately placing the vehicle in second gear. For this purpose the drum 94 in Fig. 1 and the drum 112 in Fig. 12 is loose on the shaft 43, except as shown more particularly in Fig. 12 there is a readily releasable spring pressed detent 135 to aid in bringing about engagement of the clutch, and in each instance the drum carries a clutch gear or jaw member 136 which is engaged by a clutch gear or jaw clutch member 137 whose hub is keyed to the shaft 43 by the splines 138 and hence a shifting of jaw clutch 137, under manual control, out of mesh with its companion gear will release the high speed clutch mechanism from the driven shaft and hence allow the vehicle to proceed immediately in second gear regardless of the engagement at that instant of the automatic high speed clutch.

After the clutch gears 136 and 137 are again engaged and the drum 94 or 112 is in driving engagement with the driven shaft, the operator may proceed as initially described to put the vehicle in high gear.

For effecting the reverse drive through the epicyclic gear train, means have been provided for holding the shaft 39 against rotation while allowing the planetary carrier to rotate freely and for controlling the one-way brake of the planetary carrier to allow its reverse rotation.

For holding the shaft 39 against rotation, reference is now made to Figs. 1 and 4 wherein it will be noted that a clutch gear or jaw clutch member 138 has its base flange 138' secured to the fixed end plate 24 of the casing by bolts 139 and is adapted to be alined with a companion clutch gear 140 secured to the hub portion 83 which has been noted is keyed to the shaft 39. A movable clutch member 141, which has internal teeth meshing with the teeth of member 138 and hence with those of gear 140, will when moved into position for reverse lock member 83 and shaft 39 against movement since member 141 cannot rotate because it is mounted on the fixed member 138.

For releasing the one-way brake of the planetary carrier, I have shown in Figs. 6, 8 and 18 a means for shifting the rollers 93 to a neutral position which consists of a roller shifting disk 142 which has a spindle portion 143 journalled in the fixed cam 91 and having an extension 144 keyed to a crank arm 145, under manual control as hereinafter described, said disk having a flanged rim portion 146 that is provided with slots 147 in which the rollers 93 work and by which they are confined to certain zones of operation relative to the cam 92, it being noted that when the disk 142 is turned anti-clockwise to bring the rollers 93 into the bases of the wedges 92 that they cannot engage the drum 89 and hence cannot be moved thereby into wedging engagement therewith and consequently the shaft 87 and the planet carrier geared thereto is free to revolve in the reverse direction about the gear 48 and either the drum 94 or 112 is free to revolve on the shaft 43 since for reverse drive the clutch gear 136 is disengaged from the clutch gear 137.

It is sometimes desirable to maintain the vehicle in second gear so as to permit the engine to act as a brake while descending steep grades and for this purpose I have provided manually controlled brake mechanism associated with the brake actuator shaft 86 for the planet carrier and as shown in Figs. 6 and 9 to 11, I have provided a brake drum 148 mounted on a hub member 149 secured to the shaft 86 and adapted to be engaged by a coiled spring brake member 150, one end 151 of which is anchored to a fixed casing part 152 and the other end 153 of which is bent to work in a slot in an actuator drum 154 between the stops 155 and 156, said drum 154 being itself journalled on a stud shaft 157, secured to a cap member 158. This drum 154 has a gear 159 formed on its hub meshing with a rack 160 slidably mounted in a guide 161. With this arrangement turning the drum 154 counter-clockwise as viewed in Fig. 11 will bring stop 155 into engagement with end 153 of spring 50 and cause it to expand against the brake drum 148 and thus since the other end of said spring is fixed, slow down and finally stop the rotation of the drum 148 and consequently the shaft 86 and the planet carrier so that the vehicle may remain in second gear. It is known that with a planetary type transmission when the driven gear drives the driver, the planetary carrier revolves in the same direction as that of the driver and by use of the brake above described this rotation of the planet carrier is stopped and a definite gear ratio between the drive and driven shafts established with the compression of the engine utilized as a braking means.

The controls for putting the vehicle into running position, into second gear directly while traveling in high gear, into reverse, and for locking the vehicle in second gear will now be described.

Referring to Figs. 14 to 17 the numeral 162 designates the dash of the vehicle and 163 what I have termed an engager; the same being a rod slidably and rotatably mounted in a casing 164, secured to the instrument board panel of the dash and working through an opening 165 in said dash and provided with a handle 166. This rod or engager 163 carries a pin 167 adapted to be engaged in one of three notches 168 in a slotted guide and lock member 169 and has a flat side 163' so that when the same is in any one of its positions registering with a notch 168 it will be releasably held therein by a detent 170 slidably mounted in a bore in the casing 164 and urged against the engager by a spring 171 mounted in said casing. The engager may be released from any one of its positions by turning the same to move the pin out of one of the notches 168 and to a position to bring said pin into line with the horizontally disposed slot of the guide 169 and then moving it forwardly or backwardly and thereafter turning it upwardly to bring it into position with the proper notch. The engager has three positions indicated by the letters F, N and and R on Fig. 14. The engager is pivotally connected to a lever 172 pivoted at 173 to a bracket on the dash and since it or part of it is to be turned, it has a swivel joint connection 174 intermediate its ends formed by the headed ends 175 and 176 of parts of the rod 163 which are coupled together by a flanged collar 177 secured by a cotter pin 178 to the end 175. The lever 172 is operatively connected by a link 179 to a crank arm 180 on a control shaft 181 journalled in the casing section 23 and carrying a forked shifter member 182 whose pin ends 183 work in an annular groove 184 in the clutch member 141, see Figs. 1 and 4.

A second control shaft 185 is journalled in bosses in the casing section 25 and carries a forked shifter member 186 whose ends work in an annular groove 187 in the clutch member 137.

The control shaft 181 as shown in Fig. 2 and 18, has mounted on one of its exterior ends, a crank 188 operatively connected by a link 189 to a lever 190 loosely mounted on the shaft 185 and pivotally connected at 191 to a link 192 which is pivotally connected at 193 to a plunger rod 194, said rod having an adjustable threaded connection 195 with a plunger 196 slidably mounted in a tubular guide extension formed in the outer housing 197 of the automatic brake mechanism, said plunger adapted to be moved downwardly to engage the crank arm 145 that acts, as we have seen, to shift the disk 142 and hence the rollers 93 to a release position. This arm 145 is normally urged to an engaging position by a plunger 198 moved against said arm by a spring 199 mounted in said guide extension.

The control shaft 185 carries an arm 200 that has a lost motion connection with the lever 190 through a lug 201 on said lever provided with an adjustable stop screw 202 engageable with said arm. The above described linkage is tensioned by a spring 203 engaging the arm 200 at one end and anchored to the case at its other end, it being noted that the engager resists the tension of this spring through the linkage above described.

When the engager 163 is in forward position the clutch members 141 and 137 are in the position shown in Fig. 1 and the linkage controlling the automatic brake is in the position shown in Fig. 18, it being noted that the crank arm 145 has then been moved by the plunger 198 to bring the rollers 93 to an operative position. When the engager is moved back to neutral position the shaft 181 is turned in a clockwise direction thereby moving the clutch member 141 forwardly along the member 138 and through crank 188 and link 189 swinging the lever 190 downwardly against the tension of a spring 203. This downward movement of the lever 190 causes the plunger 196 to be moved downwardly to engage arm 145 and release the automatic brake by movement of disk 142 and rollers 93 to a release position and also acts through arm 200 to turn shaft 185 to cause shifter member 186 to move clutch member 137 out of engagement with clutch member 136 and thus the transmission is disconnected with the driven shaft 43. When the engager is moved farther back to a reverse position the shaft 181 is further rotated in the same direction to act through shifter member 182 to move clutch member 141 to a position in engagement with clutch member 140 thereby as we have seen locking shaft 39 against movement and through the linkage above described swing the lever 190 farther down thus causing a further movement of plunger 196 to move arm 145 into a farther brake release position and through arm 200 to turn shaft 185 further in the same direction to act through member 186 to move clutch member 137 farther away from clutch member 136, and this we have seen puts the transmission in reverse.

The shaft 185, see Figs. 2, 6, 9 and 14, carries a yoke shaped crank member 204, one arm of which is operatively connected by a link 205 with the rack 160 and the other arm of which has an arcuate slot 206 and a spring 204' is secured to said lever or arm 204 and anchored to the case and acts through said arm to move said shaft to a position to bring clutch member 137 into engagement with clutch member 136.

A shaft 207 upon which the usual brake pedal 208 is mounted and whose hub carries a wheel brake operating arm 209 adapted to be held by suitable tension means not shown in a release position in which its stop screw 210 engages the stop lug 211, also has a pedal 212 mounted thereon which is connected by a link 214 with the part 215 of arm 204, said link having a forked end 216 and a pin 217 working in the slot 206 and having a lost motion connection therewith so that when the shaft 185 is turned through the motion of the engager the pedal connections will not interfere therewith but when said pedal 212 is depressed it will act to swing said yoke member 204 and hence the shaft 185 to move the clutch member 137 out of engagement with the clutch member 136 when it is desired to shift from high to second gear while traveling in high gear. During this movement of the arm, the link 205 will act on the rack 160 to move it downwardly, but owing to the lost motion connection between the stop 155 and spring brake 150, this brake will not be operated. However, if it is desired to hold the vehicle in second gear, a continued downward movement of the pedal will bring the stop 155 into engagement with the end 153 of the brake member 150 and thus apply the brake to drum 148 thereby preventing rotation of shaft 86 and hence any tendency of the planet carrier to rotate.

From the foregoing it will be noted that I have provided mechanism for operating the control shaft 185 both from the engager and the pedal without interfering with each other.

When the vehicle is standing still on a hill and the transmission is in forward, in order to prevent it rolling backwards down-hill, I have provided an automatic locking means comprising a one-way automatic brake acting to hold shaft 39 against being driven by the vehicle and shown in Figs. 1 and 4. This brake includes a drum formed by the inner face of member 138, spring pressed rollers 218 engageable with the drum under the action of an actuator 219 having a splined connection at 220 with the end of the hub member 83 which is secured to the shaft 39. For forward drive, the rollers 218 are automatically released but, when through a tendency of the vehicle to drive the engine through the transmission, the shaft 39 is rotated in a reverse direction, the rollers 218 engage the drum and prevent this action and the vehicle is therefore prevented from moving backwardly.

In Fig. 1 I have also shown oil retainer rings 221 in different parts of the transmission, some of which are retained in position by a spring 222.

The general operation of the transmission and its control by the operator is very simple. With the vehicle at rest and the engager 163 in the neutral position, the operator starts the engine in the usual manner. After the engine has run for a period sufficient to warm it up, it is throttled down to idling speed and the operator shifts the engager from neutral to forward position where it stays under all ordinary conditions of driving. The operator then proceeds from first to second gear automatically and from second to high as has been described in connection with the automatic clutch mechanism, it being understood that the automatic spring clutch mechanism used for high speed may also be used in place of the weights 81. If under such conditions of driving while the operator is proceeding in high gear, he wishes to immediately proceed in second, he presses his foot down on the pedal 212 to release the drum 94 or 112 from the driven shaft 43 and the vehicle immediately proceeds in second gear. If while driving down a hill, he wishes to use the engine as a brake, he merely locks the vehicle in second by first putting the gear in second by the operation of said pedal 212 and continuing to press down on the same to apply the brake member 150 to lock the brake mechanism of the planetary carrier against rotation. His changing from second to high under ordinary conditions of driving is dependent upon the relative speed of the car and engine. If he desires to reverse the vehicle he moves the engager 163 to reverse position when the car is standing still and then the engine is connected to drive the transmission in reverse.

It will be noted in Fig. 1 that the overrunning clutch including the rollers 63 and the drums 61, 74, 80 and the clutch members of the second speed automatic clutch may all be assembled inside the casing section 23 with the automatic brake including the rollers 93 before shifting these parts endwise to bring the end 35 of the shaft 34 into position in the bore 36 and the parts of the first clutch mechanism into position relative to the drum 74.

The automatic clutch that connects the engine with the shaft 34 of the transmission is of course designed so that it will keep the engine in clutched engagement with the transmission when the engine is operating at any driving speed so as to keep the transmission in gear. This automatic clutch however, is designed to be in disengaged position at the idling speed of the engine and it is also understood that any suitable manually releaseable clutch may be used between the engine and the transmission.

I desire it to be understood that this invention is not to be limited to any particular form or arrangement of parts except in so far as limitations are included in the claims.

What I claim as my invention is:

1. In a power transmission, the combination of a drive shaft, a driven shaft, a planetary gear mechanism between said shafts for connecting said drive shaft to said driven shaft, and automatic clutch mechanism for establishing a driving relation between said shafts through said gear mechanism on a temporary reduction in speed of the drive shaft below that of the driven shaft comprising a coiled spring clutch element and speed responsive means for actuating said element, said clutch element being free to slip in one direction during shifting when the driven shaft runs ahead of the drive shaft.

2. In a power transmission, the combination of a drive shaft, a driven shaft, a planetary gear mechanism between said shafts for connecting said drive shaft to said driven shaft and including a planetary gear carrier and automatic clutch mechanism for connecting the planetary gear carrier with said driven shaft including a drum associated with one of said last two named elements, speed responsive means associated with the other of said two named elements, and a coil clutch connected for movement by said speed responsive means into engagement with said drum, said coil clutch element being fixed to one of said two named elements but free to slip relative to the other of said two named elements in one direction when the planetary gear carrier runs ahead of the driven shaft.

3. In a power transmission, the combination of a drive shaft, a driven shaft, a planetary gear mechanism between said shafts for connecting said drive shaft to said driven shaft and including a planetary gear carrier, automatic clutch mechanism for connecting said planetary gear carrier with said driven shaft including a clutch element adapted to slip only in the direction of rotation of the driven shaft to prevent a driving engagement between said driven shaft and the planetary gear when said carrier is running ahead of said driven shaft, and speed responsive means for actuating said clutch element.

4. In a change speed transmission mechanism, the combination of a drive shaft, a driven shaft, a single multi-speed planetary gear unit between said shafts including a planetary gear carrier, driven, drive and reduction gears, means for connecting said drive shaft with the low speed gear of said unit, speed responsive clutch mechanism for connecting said drive shaft with the second speed gear of said unit, automatic brake mechanism for the planetary gear carrier, means for releasing said automatic brake mechanism, and a manually operable jaw clutch mechanism for holding one of the drive gears of said unit against rotation when said automatic brake mechanism is released for reverse drive.

5. In a change speed transmission mechanism, the combination of a pair of drive shafts, a driven shaft, a variable speed planetary gear unit between said shafts including a planetary gear carrier, shiftable automatic brake mechanism for the planetary gear carrier, shiftable jaw clutch mechanism for one of said drive shafts to prevent rotation of the same in reverse, and control means for said brake mechanism and said clutch mechanism for jointly shifting the same.

6. In a change speed transmission mechanism, the combination of a drive shaft, a driven shaft, a variable speed planetary gear mechanism connecting said shafts and including a planetary gear carrier, automatic clutch mechanism for connecting said planetary gear carrier with said driven shaft, manually operable clutch mechanism between said automatic clutch mechanism and said driven shaft, manually operable coil brake mechanism for said planetary gear carrier, and control means for said manually operable clutch mechanism and said manually operable brake mechanism for releasing said manually operable clutch mechanism and operating said brake mechanism.

7. In a change speed transmission, the combination of a drive shaft, a driven shaft, planetary gear mechanism between said shafts and operatively connected to the same and including a planetary gear carrier, a shaft intergeared with said planetary carrier, automatic brake mechanism for said last named shaft to prevent reverse rotation of said carrier, and a manually operable coil brake for said last named shaft to prevent rotation of said carrier in either direction.

8. In a change speed transmission, the combination of a drive shaft, a driven shaft, planetary gear mechanism between said shafts and operatively connecting the same and including a planetary gear carrier, automatic clutch mechanism for connecting said planetary gear carrier with said driven shaft, manually operable clutch mechanism between said automatic clutch mechanism and said driven shaft, a control shaft connected to said manually operable clutch mechanism, and separate controls for said shaft having a lost motion connection relative to each other for independently operating said control shaft.

9. In a change speed transmission mechanism, the combination of a drive shaft, a driven shaft, planetary gear mechanism between said shafts and operatively connecting the same and including a planetary gear carrier, automatic clutch mechanism for said planetary gear carrier for connecting said carrier with said driven shaft, manually operable clutch mechanism between said automatic clutch mechanism and said driven shaft, a control shaft connected to said manually operable clutch mechanism, and a second control shaft operatively connected to said first named control shaft but having a lost motion connection therewith whereby said manually operable clutch mechanism is operated by either of said shafts.

10. In a change speed transmission mechanism, the combination of a drive shaft, a driven shaft, planetary gear mechanism between said shafts and operatively connecting the same and including a planetary gear carrier, automatic clutch mechanism for said planetary gear carrier for connecting said carrier with said driven shaft, manually operable clutch mechanism between said automatic clutch mechanism and said driven shaft, automatic brake mechanism for said planetary carrier, manually operable brake mechanism for said planetary carrier, a movable control shaft operatively connected to said manually operable clutch mechanism and having a lost motion operating connection with said manually operable brake mechanism to provide for the independent operation of said manually operable clutch mechanism and on the continued movement of said control shaft for the conjoint operation of said manually operable brake mechanism and said manually operable clutch mechanism.

11. In a change speed transmission mechanism, the combination of a drive shaft, a driven shaft, planetary gear mechanism between said shafts and operatively connecting the same and including a planetary gear carrier, automatic clutch mechanism for said planetary gear carrier for connecting said carrier with said driven shaft, manually operable clutch mechanism between said automatic clutch mechanism and said driven shaft, automatic brake mechanism for said planetary carrier, means for releasing said automatic brake mechanism, manually operable brake mechanism for said planetary carrier, a control shaft operatively connected to said manually operable clutch mechanism, said automatic brake release means and said manually operable brake mechanism, the connection between said control shaft and said manually operable brake mechanism including parts providing for movement of said control shaft to operate said manually operable clutch mechanism independent of said manually operable brake mechanism, operating means having a lost motion connection with said control shaft for simultaneously operating said manually operable clutch mechanism and said automatic brake release means, a second operating means for also operating said control shaft and having a lost motion connection therewith for the independent operation of said control shaft by the first named operating means.

12. In a change speed transmission mechanism, the combination of a drive shaft, a driven shaft, planetary gear mechanism between said shafts and operatively connecting the same including a planetary gear carrier, automatic brake mechanism for preventing backward rotation of said carrier, said carrier having a drum extension, a coiled spring clutch element connected with said driven shaft and engageable with the inner side of said drum, speed responsive members mounted within said drum and driven by said driven shaft, one of said members operatively connected to said clutch element to move the same into engagement with said drum, and means for locking said members against movement until the driven shaft has reached a predetermined speed.

13. In a change speed transmission mechanism, the combination of a drive shaft, a driven shaft, planetary gear mechanism between said shafts and operatively connecting the same and including a planetary gear carrier one-way automatic brake mechanism to prevent backward rotation of the carrier including brake elements and a brake actuator connected for movement by said carrier, means for moving said brake elements to operative and inoperative position including an oscillatory member, means normally urging said member to a position for automatic engagement of said brake elements on the reverse rotation of said carrier, and manually operable means for moving said member to move said brake elements to an inoperative position.

14. In a change speed transmission mechanism, the combination with an engine shaft, of a pair of drive shafts, a driven shaft, a variable speed gear unit between said drive shafts and said driven shaft, means for establishing a driving relation from said engine shaft to either of said drive shafts, including an overrunning clutch having a pair of actuators mounted on one of said drive shafts and clutch elements arranged on said actuators in staggered relation, and means for automatically establishing a driving relation through said unit with either of said drive shafts.

In testimony whereof, I affix my signature.
OSCAR H. BANKER.